United States Patent
Otsubo (10) Patent No.: US 9,869,876 B2
(45) Date of Patent: Jan. 16, 2018

(54) IMAGE DISPLAY APPARATUS AND IMAGE DISPLAY METHOD

(71) Applicant: Asukanet Company, Ltd., Hiroshima-shi, Hiroshima (JP)

(72) Inventor: Makoto Otsubo, Hiroshima (JP)

(73) Assignee: ASUKANET COMPANY, LTD., Hiroshima-shi (JP)

( * ) Notice: Subject to any disclaimer, the term of this patent is extended or adjusted under 35 U.S.C. 154(b) by 0 days.

(21) Appl. No.: 15/311,919

(22) PCT Filed: Jun. 4, 2015

(86) PCT No.: PCT/JP2015/066196
§ 371 (c)(1),
(2) Date: Nov. 17, 2016

(87) PCT Pub. No.: WO2015/186789
PCT Pub. Date: Dec. 10, 2015

(65) Prior Publication Data
US 2017/0102552 A1  Apr. 13, 2017

(30) Foreign Application Priority Data

Jun. 5, 2014 (JP) ................. 2014-116904

(51) Int. Cl.
*G02B 5/122* (2006.01)
*G02B 27/22* (2006.01)

(52) U.S. Cl.
CPC ......... *G02B 27/2292* (2013.01); *G02B 5/122* (2013.01)

(58) Field of Classification Search
CPC ..... G02B 27/2292; G02B 5/122; G02B 5/124
(Continued)

(56) References Cited

U.S. PATENT DOCUMENTS 6,055,108 A    4/2000  Dreyer
2010/0177402 A1  7/2010  Maekawa
(Continued)

FOREIGN PATENT DOCUMENTS

JP    2002-543447 A    12/2002
JP    2009-25776 A     2/2009
(Continued)

OTHER PUBLICATIONS

International Search Report dated Aug. 11, 2015, issued in counterpart application No. PCT/JP2015/066196. (2 pages).

*Primary Examiner* — James Phan
(74) *Attorney, Agent, or Firm* — Westerman, Hattori, Daniels & Adrian (57) ABSTRACT

Light rays from an image A are made to enter one or more retroreflective bodies formed by first and second light-reflective surfaces 13 and 14 and third light-reflective surfaces 15, the first and second light-reflective surfaces 13 and 14 each being orthogonal to one another and formed in a right-triangle-wave pattern in cross section, the third light-reflective surfaces 15 being orthogonal to each of corresponding ones of the first and second light-reflective surfaces 13 and 14, a direction of each of one or more reflected lights from the one or more retroreflective bodies is further turned in a different direction on a corresponding one of fourth light-reflective surfaces 16, and an image B is formed at a different position.

8 Claims, 6 Drawing Sheets (58) Field of Classification Search
USPC .................................. 359/529–530, 834, 836
See application file for complete search history.

(56) References Cited

U.S. PATENT DOCUMENTS

| | | |
|---|---|---|
| 2010/0265585 A1 | 10/2010 | Kim et al. |
| 2012/0092766 A1* | 4/2012 | Maekawa ............. G02B 5/136 |
| | | 359/546 |
| 2016/0033776 A1 | 2/2016 | Otsubo |

FOREIGN PATENT DOCUMENTS

| | | |
|---|---|---|
| JP | 2009-300623 A | 12/2009 |
| JP | 2011-511303 A | 4/2011 |
| JP | 4865088 B2 | 2/2012 |
| JP | 5466793 B1 | 4/2014 |
| WO | 2000/065382 A2 | 11/2000 |
| WO | 2009/131128 A1 | 10/2009 |

* cited by examiner

IMAGE DISPLAY APPARATUS AND IMAGE DISPLAY METHOD

TECHNICAL FIELD

The present invention relates to an image display apparatus and image display method that are provided with a plurality of light-reflective surfaces (mirrors) and that can form volumetric images (images) in the air depending on objects (images).

BACKGROUND ART

As apparatuses and a method for displaying volumetric images, a stereoscopic image display device of Patent Literature 1 and an optical imaging device and optical imaging method of Patent Literature 2 have been known so far. The technique described in Patent Literature 1 is one that forms volumetric images as real images on a surface on an opposite side of a display device by arranging a large number of dihedral corner reflectors in a grid-like pattern, and making light having reflected off one surface of each of the dihedral corner reflectors reflect off a surface orthogonal to each of these dihedral corner reflectors.

The optical imaging device of Patent Literature 2 was one in which a first and second light-controlling panel each having a large number of belt-shaped, planar light-reflective portions are arranged such that the planar light-reflective portions in the first light-controlling panel are aligned orthogonal to the planar light-reflective portions in the second light-controlling panel, and with which stereoscopic images arranged on either a front surface side or a back surface side of the optical imaging device become formed on the other side as real images, the planar light-reflective portions in the first light-controlling panel being orthogonal to the front and back surfaces of the first light-controlling panel, the planar light-reflective portions in the second light-controlling panel being orthogonal to the front and back surfaces of the second light-controlling panel.

In Patent Literature 3, there is disclosed a stereoscopic image display device with which stereoscopic images become formed in the air by planarly arranging a large number of corner cubes (cubic corner bodies) used as retroreflective bodies and made of a transparent body (glass, plastic), making a top of each of the corner cubes a flood light hole by notching the top, and forming half-mirrors at light-receiving holes.

CITATION LIST

Patent Literature

Patent Literature 1: Japanese Unexamined Patent Application Publication No. 2009-300623
Patent Literature 2: WO 2009/131128 A1
Patent Literature 3: Japanese Patent No. 5466793

SUMMARY OF INVENTION

Technical Problem

The stereoscopic image display device of Patent Literature 1 has problems such as a difficulty in production due to the use of the large number of dihedral corner reflector arrays, and a difficulty in obtaining vivid images due to a tendency for light to lack in amount to be used as a whole.

The technique of Patent Literature 2 also has a problem of costly production at this time due to the use of the first and second light-controlling panels each having the large number of belt-shaped, planar light-reflective portions.

The stereoscopic image display device of Patent Literature 3 has problems as follows:
1) there is a difficulty in production of a high-precision model since the device is formed by aligning a large number of minute corner cubes; 2) the top of each of the corner cubes has a notch, and there are cases where objects become visible from these notches through the half-mirrors; and 3) it is difficult to make images-to-be-formed vivid since the half-mirrors and the flood light holes made by notching part of the top of each of the corner cubes are used.

The present invention has been made in view of the above circumstances, and an object thereof is to provide an image display apparatus and image display method that can be produced relatively easily, with which objects are not visible even when directly looked at, and with which images-to-be-formed are more vivid than ever.

Solution to Problem

In order to achieve the above object, an image display apparatus according to a first aspect of the present invention that receives light rays from an image A on one side of the image display apparatus and forms an image on the other side of the image display apparatus as an image B, includes first light-reflective surfaces and second light-reflective surfaces formed orthogonal to one another and continuously, third light-reflective surfaces orthogonal to each of corresponding ones of the first and second light-reflective surfaces and arranged vertically, and fourth light-reflective surfaces each located next to corresponding ones of the first and second light-reflective surfaces and arranged horizontally, and the image B becomes formed either 1) by light rays from the image A each reflecting off one each of the first to third light-reflective surfaces that form retroreflective bodies and then turning in a different direction on a corresponding one of the fourth light-reflective surfaces or 2) by light rays from the image A each turning in a different direction on one of the fourth light-reflective surfaces and then being reflected by a corresponding one each of the first to third light-reflective surfaces that form retroreflective bodies.

In the case of the image display apparatus according to the first aspect of the present invention, it is preferred that the first and second light-reflective surfaces be formed in a triangle-wave pattern at lower portions of first transparent bodies that are rectangular and long in plan view, that second transparent bodies are provided adjacent to the first transparent bodies, that the fourth light-reflective surfaces each be formed in an intermediate position or at a ceiling position of each of the second transparent bodies that are rectangular and long in plan view, and that the third light-reflective surfaces be provided to side surfaces of the first transparent bodies.

In the case of the image display apparatus according to the first aspect of the present invention, alternatively, each of the first transparent bodies can be arranged facing backwards to an other one of the first transparent bodies, each pair of the first transparent bodies having one of the third reflective surfaces in the middle so as to form one of composite blocks, and the second transparent bodies can be arranged between each of the composite blocks arranged spaced from one another.

Additionally, in the case of the image display apparatus according to the first aspect of the present invention, the first transparent bodies and the second transparent bodies can also be arranged alternately.

In the case of the image display apparatus according to the first aspect of the present invention, it is preferred that valley portions to be formed by the first and second light-reflective surfaces at the lower portions of the first transparent bodies be filled with transparent resin or transparent glass, and that the first transparent bodies be cuboid-shaped.

In the case of the image display apparatus according to the first aspect of the present invention, it is preferred that the first to fourth light-reflective surfaces be formed by means of metal vapor-deposition treatment. However, the first to fourth light-reflective surfaces may be formed by means of plating, spattering, film-sticking, and the like.

In order to achieve the above object, an image display method according to a second aspect of the present invention makes light rays from an image A incident on one or more retroreflective bodies to be formed by first and second light-reflective surfaces and third light-reflective surfaces, the first and second light-reflective surfaces each being orthogonal to one another and formed in a right-triangle-wave pattern in cross section, the third light-reflective surfaces being orthogonal to each of corresponding ones of the first and second light-reflective surfaces, further makes each of one or more reflected lights from the one or more reflective bodies turn in a different direction on a corresponding one of fourth light-reflective surfaces, and forms an image B at a different position.

In the case of the image display method according to the second aspect of the present invention, it is preferred that the third light-reflective surfaces be formed vertically, and that the fourth light-reflective surfaces be formed horizontally.

In the cases of the above image display apparatus and image display method, it is preferred that tilted mirrors be used as the first and second light-reflective surfaces, that vertical mirrors be used as the third light-reflective surfaces, and that horizontal mirrors be used as the fourth light-reflective surfaces. However, the first to fourth light-reflective surfaces are not limited to these states.

Advantageous Effects of the Invention

In the cases of the image display apparatus and image display method according to the present invention, since the structure is simple, having the first to third light-reflective surfaces forming the retroreflective bodies for which corner cubes are used; and also having the fourth light-reflective surfaces each changing a direction of each of one or more reflected lights from one or more of the retroreflective bodies or a direction of each of one or more lights incident on one or more of the retroreflective bodies, the first to fourth light-reflective surfaces can be arranged with regularity, which allows the whole apparatus to be produced at a relatively low cost. Especially, assembling and producing the apparatus after forming the first to fourth light-reflective surfaces on the first and second transparent bodies further allow for easy production of the apparatus with high precision.

Additionally, since there is not any light ray linearly penetrating the front and back of the image display apparatus when the apparatus is looked at from the front, an image A will not be seen when observing an image B.

BRIEF DESCRIPTION OF THE DRAWINGS

FIG. 1 shows explanatory diagrams of an image display apparatus according to a first embodiment of the present invention.

FIG. 5 shows explanatory diagrams of an image display apparatus according to a second embodiment of the present invention.

DESCRIPTION OF EMBODIMENTS

Next, with reference to the accompanying drawings, descriptions will be given on embodiments of the present invention.

Figure 1A:
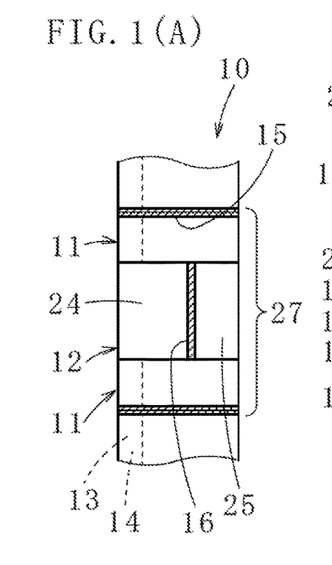
FIG. 1(A) is a side view.
Figure 1B:
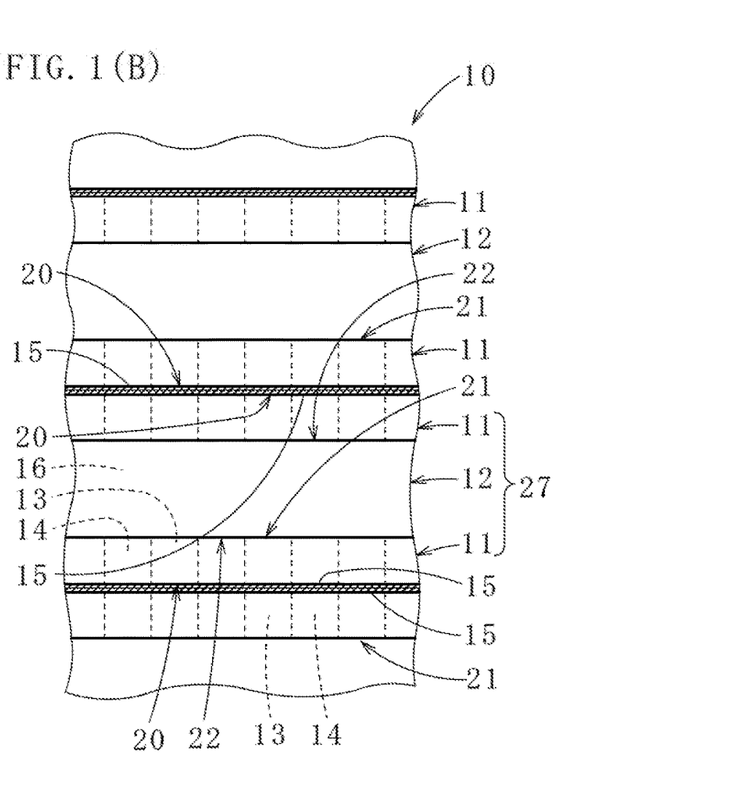
FIG. 1(B) is a plan view.
Figure 1C:
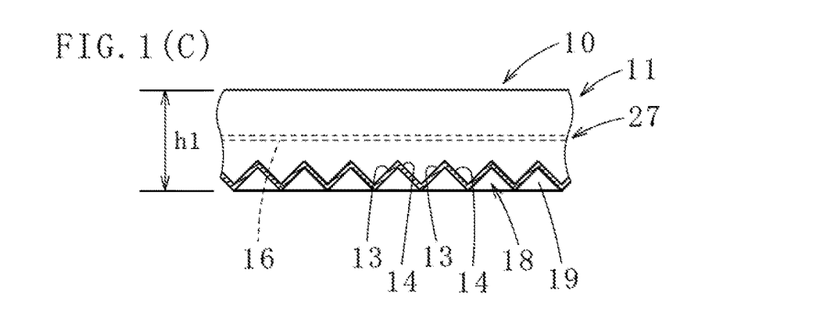
FIG. 1(C) is a front view.

As illustrated in FIGS. 1(A) to 1(C), an image display apparatus 10 according to a first embodiment of the present invention is formed by arranging first transparent bodies 11 and second transparent bodies 12 that are made of transparent glass or transparent plastic and each rectangular and long in plan view. At lower portions of the first transparent bodies 11, there are first and second tilted mirrors (an example of first and second light-reflective surfaces) 13 and 14 arranged orthogonal to one another and in a right-triangle-wave pattern in one direction in cross section, and on one side surfaces 20 along longitudinal directions of the first transparent bodies 11, there are third vertical mirrors (an example of third light-reflective surfaces) 15 each orthogonal to each of corresponding ones of the first and second tilted mirrors 13 and 14 and arranged vertically.

Figure 2:
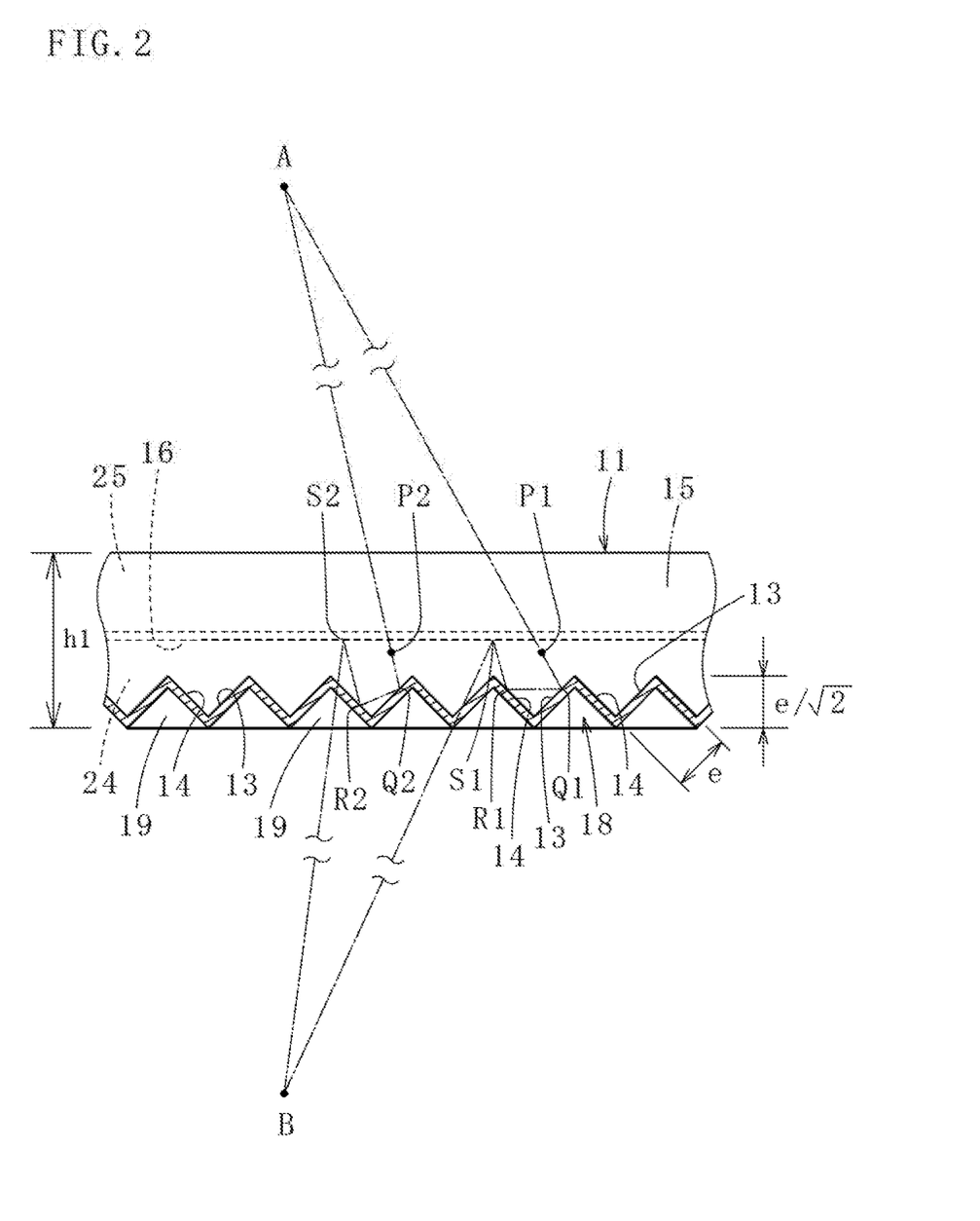
FIG. 2 is a behavior explanatory diagram of the same image display apparatus.

The first transparent bodies 11, as illustrated in FIG. 2, have a plurality of valley portions 18 formed by the first and second tilted mirrors 13 and 14 at the lower portions of the first transparent bodies 11. Transparent resin (transparent glass and the like are also usable) 19 becomes filled inside these valley portions 18, and a bottom face of the transparent resin 19 filled in each of these valley portions 18 is flat. Each of the first transparent bodies 11 thereby takes the form of a cuboid. In this embodiment, the first transparent bodies 11 and the second transparent bodies 12 each have a same height h1, which is 1 to 5 times a width e of each of the first and second tilted mirrors 13 and 14. The first transparent bodies 11 and the second transparent bodies 12 may have different heights, and the first tilted mirrors 13 and the second tilted mirrors 14 may also have different widths. It is preferred that an angle of each of the first and second tilted mirrors 13 and 14 be 45 degrees with respect to the bottom face of the transparent resin 19.

On the one side surfaces 20 at end portions in valley directions (mountain directions) of the first transparent bodies 11, as described earlier, the third vertical mirrors 15 are formed. The other side surfaces 21 of the first transparent bodies 11 each are transparent and in contact with a corresponding one of side surfaces 22 of the second transparent bodies 12. Each of the first transparent bodies 11, with one of the shared (or independently arranged) third vertical mirrors 15 in the middle, becomes arranged facing backwards to an other one of the first transparent bodies 11 so as to be in pairs, forming composite blocks. Hence, each of the second transparent bodies 12 is arranged in the middle between each set of the paired first transparent bodies 11 (i.e., the composite blocks) arranged spaced from one another. In this embodiment, the third vertical mirrors 15 provided to the side surfaces of the first transparent bodies 11 are stacked in two layers.

In intermediate positions of the cuboid-shaped second transparent bodies 12, fourth horizontal mirrors (an example of fourth light-reflective surfaces) 16 each located next to corresponding ones of the first and second tilted mirrors 13 and 14 and arranged horizontally are provided. To be specific, each of the second transparent bodies 12 has one each of lower blocks 24 and upper blocks 25, the lower blocks 24 and the upper blocks 25 having a same form or different forms, and the fourth horizontal mirrors 16 are provided to ceiling planes of the lower blocks 24.

These fourth horizontal mirrors 16 can be alternatively provided to the upper surfaces (ceiling planes) of the second transparent bodies 12. The second transparent bodies 12 could be shorter in height than the height h1 of the first transparent bodies 11; however, it is preferred that the fourth horizontal mirrors 16 be positioned higher than a height of each of the mountain portions (top portions) of the first and second tilted mirrors 13 and 14.

Figure 3:
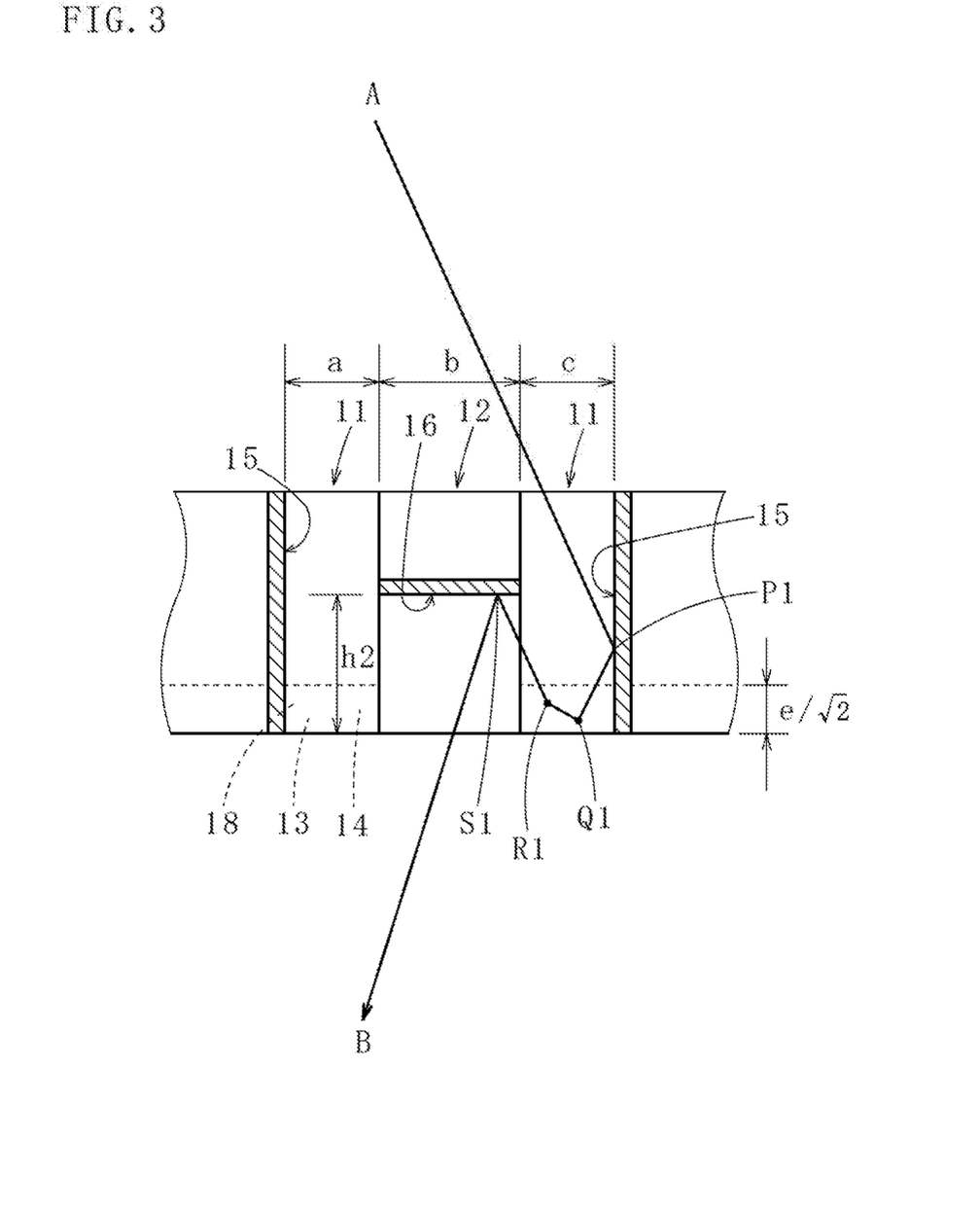
FIG. 3 is a behavior explanatory diagram of the same image display apparatus.

In this embodiment, a height h2 of each of the fourth horizontal mirrors 16 is, for example, 1 to 4 times a height $e/\sqrt{2}$ ($=0.707e$) of each of the first and second tilted mirrors 13 and 14 (see FIGS. 2 and 3).

In this embodiment, one of the second transparent bodies 12, together with the first transparent bodies 11 arranged adjacent to both sides of the one of the second transparent bodies 12, forms a single one of block bodies 27, and the image display apparatus 10 is composed of a plurality of the long block bodies 27 arranged side by side and connected to one another.

As illustrated in FIG. 3, it is preferred that widths a and c of the first transparent bodies 11 be 0.3 to 3 times a width b of each of the second transparent bodies 12. However, the present invention is not to be limited to these numerical values.

Next, descriptions will be given on behaviors and effects of the image display apparatus 10 according to the first embodiment of the present invention, as well as on an image display method.

As illustrated in FIGS. 1 to 3, light rays from an image A on one side of the image display apparatus 10 each enter one of the first transparent bodies 11, then reflect off either P1 or P2 on one of the third vertical mirrors 15 of the image display apparatus 10, and subsequently reflect off either Q1 and R1 or Q2 and R2 on the first and second tilted mirrors 13 and 14. Corner cubes each having three right-angled planes and composing retroreflective bodies become formed by the third vertical mirrors 15 and the first and second tilted mirrors 13 and 14, and the light rays each reflect in the same direction (at the same angle) as an incidence direction (angle). Reflection orders among the first and second tilted mirrors 13 and 14 and the third vertical mirrors 15 are not specified.

The light rays having reflected off the first and second tilted mirrors 13 and 14 and the one of the third vertical mirrors 15 each are led into an inside of the second transparent bodies 12 through a corresponding one of by a corresponding one of the side surfaces of the second transparent bodies 12, reflect off either S1 or S2 on one of the fourth horizontal mirrors 16 to turn in a different direction, and form an image (a real image) B on the other side of the image display apparatus 10. In this embodiment, the image A and the image B are formed bilaterally symmetrical with reference to the image display apparatus 10. In FIG. 2, the pathways of light rays are not illustrated identical to actual pathways in order to simplify the descriptions.

In the above embodiment, it is preferred to form the first and second tilted mirrors 13 and 14, the third vertical mirrors 15, and the fourth horizontal mirrors 16 by vapor-depositing a metal (e.g., aluminum, silver, etc.).

Figure 4:
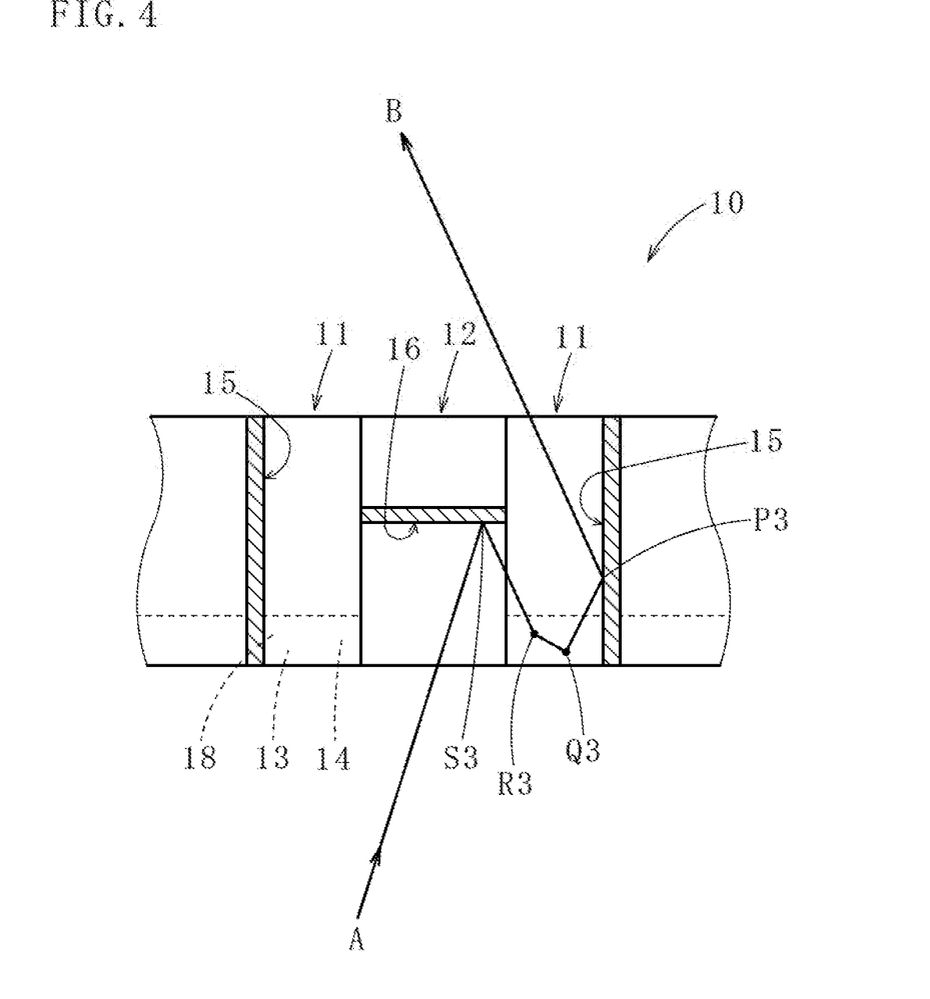
FIG. 4 is an explanatory diagram showing an example of an other usage of the same image display apparatus.

An example of an other usage of the image display apparatus 10 according to one embodiment of the present invention is illustrated in FIG. 4. Here, directions of incident light rays and exiting light rays are illustrated opposite to examples illustrated in FIG. 3. That is, the image display apparatus 10, in which light rays from an image A on one side (a lower side in FIG. 4) each are made to enter and an image is formed as an image B on the other side, has fourth horizontal mirrors 16 that receive light rays from the image A, orthogonally-arranged first and second tilted mirrors 13 and 14 that receive one or more reflected lights each having turned in a different direction on a corresponding one of the fourth horizontal mirrors 16, and third vertical mirrors 15 that receive one or more reflected lights from the first and second tilted mirrors 13 and 14, the third vertical mirrors 15 being orthogonal to each of corresponding ones of the first and second tilted mirrors 13 and 14, and the image display apparatus 10 forms an image B by means of the one or more reflected lights from a corresponding one of the third vertical mirrors 15. Since the first and second tilted mirrors 13 and 14 and the third vertical mirrors 15 form corner cubes (retroreflective bodies), reflection orders of light rays are arbitrary. In FIG. 4, S3, R3, Q3, and P3 each indicate a reflection point.

Next, with reference to FIGS. 5(A) to 5(E) and 6, descriptions will be given on an image display apparatus 32 according to a second embodiment of the present invention.

Figure 5A:
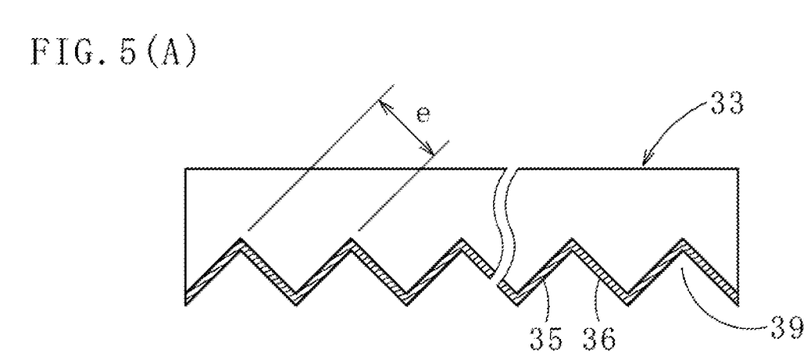
FIG. 5(A) is a front view of first transparent bodies.
Figure 5B:
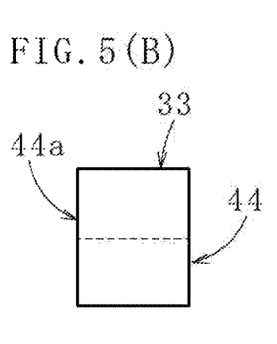
FIG. 5(B) is a side view of the same transparent bodies.
Figure 5C:
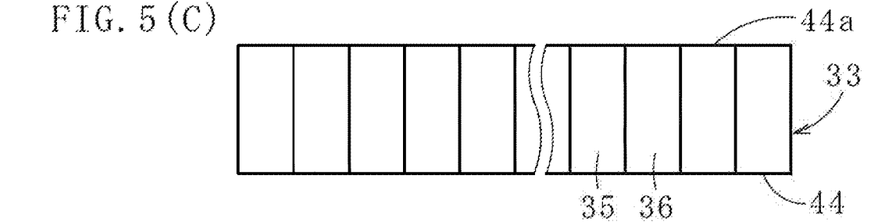
FIG. 5(C) is a bottom view of the same transparent bodies.
Figure 5D:
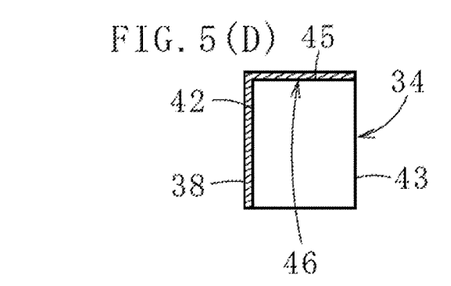
FIG. 5(D) is a side view of second transparent bodies.
Figure 5E:
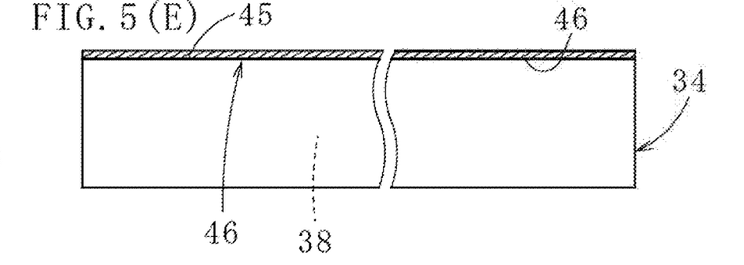
FIG. 5(E) is a front view of the same transparent bodies.
Figure 6:
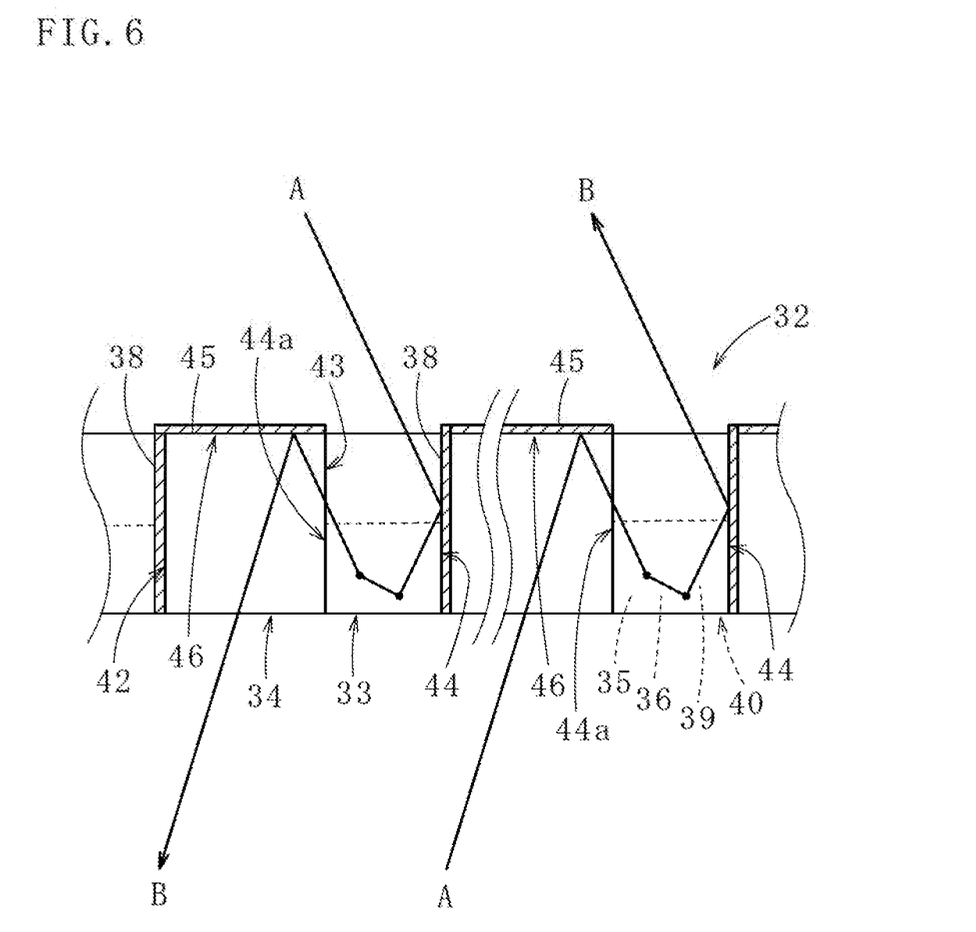
FIG. 6 is a behavior explanatory diagram of the same image display apparatus.

As illustrated in FIG. 6, the image display apparatus 32 according to the second embodiment of the present invention is formed by arranging first transparent bodies 33 and second transparent bodies 34 that are made of transparent glass or transparent plastic and each rectangular and long in plan view. As illustrated in FIGS. 5(A) to 5(C), lower portions (bottom portions) of the first transparent bodies 33 each have first and second tilted mirrors (an example of first and second light-reflective surfaces) 35 and 36 in a triangle-wave pattern in one direction, and one side surfaces 44 along longitudinal directions of the first transparent bodies 33 each have one of third vertical mirrors (an example of third light-reflective surfaces) 38 each orthogonal to corresponding ones of the first and the second tilted mirrors 35 and 36 that are orthogonal to one another. Retroreflective bodies thereby become formed by the first and second tilted mirrors 35 and 36 and the third vertical mirrors 38. In this embodiment, the third vertical mirrors 38 are provided to one side surfaces 42 of the second transparent bodies 34; however, the third vertical mirrors 38 can be alternatively formed on the side surfaces of the first transparent bodies 33.

The lower portions of the first transparent bodies 33 each, as illustrated in FIGS. 5 and 6, have the first and second tilted mirrors 35 and 36, thereby forming a plurality of constant-pitched valley portions 39. Transparent resin (transparent glass and the like are also usable) 40 becomes filled inside these valley portions 39, and a bottom face of the transparent resin 40 filled in each of these valley portions 39 is flat. Each of the first transparent bodies 33 thereby takes the form of a cuboid. In this embodiment, the first transparent bodies 33 and the second transparent bodies 34 each have a same height, which is 1 to 5 times a width e of each of the first and second tilted mirrors 35 and 36.

The first and second transparent bodies 33 and 34 may have different heights, and the first and second tilted mirrors 35 and 36 may also have different widths. It is preferred that an angle of each of the first and second tilted mirrors 35 and 36 be 45 degrees with respect to the bottom face of the transparent resin 40.

As described earlier, each of the third vertical mirrors 38 is formed on one of the one side surfaces 42 of the second transparent bodies 34, and each of the other side surfaces 43 of the second transparent bodies 34 is transparent and in contact with one of the other side surfaces 44a of the first transparent bodies 33. Each of ceiling planes 45 of the cuboid-shaped second transparent bodies 34 is provided with one of fourth horizontal mirrors (an example of fourth light-reflective surfaces) 46.

This image display apparatus 32 according to the second embodiment differs from the image display apparatus 10 according to the first embodiment in that, in the case of the image display apparatus 32, the first transparent bodies 33 and the second transparent bodies 34 are provided alternately, whereas in the case of the image display apparatus 10, the first transparent bodies 11 are provided on both sides of each of the second transparent bodies 12. Additionally, In the case of the image display apparatus 32, the third vertical mirrors 38 are on only one side of each of the fourth horizontal mirrors 46, and in FIG. 6, the image display apparatus 32 only reacts to light from images to the left of the center of each of the transparent bodies 33 and 34. However, the image display apparatus 32 becomes compactly structured.

In the case of this image display apparatus 32, when an image A is located above the image display apparatus 32 as illustrated in FIG. 6, light rays from the image A each reflect off one of the third vertical mirrors 38, and then reflect off one each of the first and second tilted mirrors 35 and 36. The first and second tilted mirrors 35 and 36 and the third vertical mirrors 38 form retroreflective bodies, each of which producing reflected light that is parallel to incident light. This reflected light turns in a different direction on a corresponding one of the fourth horizontal mirrors 46, and an image B becomes formed on a side below the image display apparatus 32.

In the case of the image display apparatus 32 according to this embodiment, the light rays from the image A each entered the one of the third vertical mirrors 38 and exited to the outside through the corresponding one of the fourth vertical mirrors 46. However, light rays can enter also from the side of the fourth horizontal mirrors 46.

The present invention is not to be limited to the above embodiments, and within the scope that does not alter the gist of the present invention, an image display apparatus and image display method can also be structured by combining partial components in the first and second embodiments.

INDUSTRIAL APPLICABILITY

In the case of the image display apparatus and image display method according to the present invention, since the structures of the apparatus and method are relatively simple, the image display apparatus can be produced at a low cost.

Additionally, the apparatus can be made larger in size by increasing the number of the first and second transparent bodies. By making the apparatus larger, large-sized, vivid volumetric images can be displayed especially in endorsements and advertising.

REFERENCE SIGNS LIST

10: image display apparatus, 11: first transparent body, 12: second transparent body, 13: first tilted mirror, 14: second tilted mirror, 15: third vertical mirror, 16: fourth horizontal mirror, 18: valley portion, 19: transparent resin, 20: one side surface, 21: other side surface, 22: side surface, 24: lower block, 25: upper block, 27: block body, 32: image display apparatus, 33: first transparent body, 34: second transparent body, 35: first tilted mirror, 36: second tilted mirror, 38: third vertical mirror, 39: valley portion, 40: transparent resin, 42: one side surface, 43: other side surface, 44: one side surface, 44a: other side surface, 45: ceiling plane, 46: fourth horizontal mirror

The invention claimed is:

1. An image display apparatus that receives light rays from an image A on one side thereof and forms an image on the other side thereof as an image B, comprising:
    first light-reflective surfaces and second light-reflective surfaces formed orthogonal to one another and continuously;
    third light-reflective surfaces orthogonal to each of corresponding ones of the first and second light-reflective surfaces and arranged vertically; and
    fourth light-reflective surfaces each located next to corresponding ones of the first and second light-reflective surfaces and arranged horizontally, wherein
    the image B becomes formed either 1) by light rays from the image A each reflecting off one each of the first to third light-reflective surfaces that form retroreflective bodies and then turning in a different direction on a corresponding one of the fourth light-reflective surfaces or 2) by light rays from the image A each turning in a different direction on a corresponding one of the fourth light-reflective surfaces and then being reflected by a corresponding one each of the first to third light-reflective surfaces that form retroreflective bodies.

2. The image display apparatus according to claim 1, wherein
    the first and second light-reflective surfaces are formed in a triangle-wave pattern at lower portions of first transparent bodies that are rectangular and long in plan view,
    second transparent bodies are provided adjacent to the first transparent bodies,
    the fourth light-reflective surfaces each are formed in an intermediate position or at a ceiling position of each of the second transparent bodies that are rectangular and long in plan view, and
    the third light-reflective surfaces are provided to side surfaces of the first transparent bodies.

3. The image display apparatus according to claim 2, wherein
    the first transparent bodies each are arranged facing backwards to an other one of the first transparent bodies, each pair of the first transparent bodies having one of the third reflective surfaces in the middle so as to form one of composite blocks, and
    the second transparent bodies are arranged between each of the composite blocks arranged spaced from one another.

4. The image display apparatus according to claim 2, wherein the first transparent bodies and the second transparent bodies are arranged alternately.

5. The image display apparatus according to claim 1, wherein valley portions to be formed by the first and second light-reflective surfaces at the lower portions of the first transparent bodies are filled with transparent resin or transparent glass, and the first transparent bodies are cuboid-shaped.

6. The image display apparatus according to claim 1, wherein the first to fourth light-reflective surfaces are formed by means of metal vapor-deposition treatment.

7. An image display method, comprising the steps of:

making light rays from an image A incident on one or more retroreflective bodies to be formed by first and second light-reflective surfaces and third light-reflective surfaces, the first and second light-reflective surfaces each being orthogonal to one another and formed in a right-triangle-wave pattern in cross section, the third light-reflective surfaces being orthogonal to each of corresponding ones of the first and second light-reflective surfaces;

further making each of one or more reflected lights from the one or more reflective bodies turn in a different direction on a corresponding one of fourth light-reflective surfaces; and forming an image B at a different position.

8. The image display method according to claim 7, wherein the third light-reflective surfaces are formed vertically, and the fourth light-reflective surfaces are formed horizontally.

* * * * *